United States Patent
Gauvreau et al.

(10) Patent No.: US 12,105,230 B2
(45) Date of Patent: Oct. 1, 2024

(54) MUON DETECTOR FOR MUON TOMOGRAPHY

(71) Applicant: KoBold Metals Company, Berkeley, CA (US)

(72) Inventors: Jean-Luc Gauvreau, Berkeley, CA (US); Daniel Snowden-Ifft, Berkeley, CA (US); Jessica Kirkpatrick, Berkeley, CA (US)

(73) Assignee: KoBold Metals Company, Berkeley, CA (US)

( * ) Notice: Subject to any disclaimer, the term of this patent is extended or adjusted under 35 U.S.C. 154(b) by 27 days.

(21) Appl. No.: 17/673,567

(22) Filed: Feb. 16, 2022

(65) Prior Publication Data
US 2023/0258827 A1     Aug. 17, 2023

(51) Int. Cl.
*G01T 1/185*     (2006.01)
*G01V 5/04*     (2006.01)
*H01J 47/00*     (2006.01)
*H01J 47/02*     (2006.01)

(52) U.S. Cl.
CPC .............. *G01T 1/185* (2013.01); *G01V 5/04* (2013.01); *H01J 47/005* (2013.01); *H01J 47/02* (2013.01)

(58) Field of Classification Search
CPC ......... G01T 1/185; G01V 5/04; H01J 47/005; H01J 47/02
See application file for complete search history.

(56) References Cited

U.S. PATENT DOCUMENTS

| | | | | |
|---|---|---|---|---|
| 4,504,438 A | * | 3/1985 | Levy | G01V 5/04 376/156 |
| 5,008,540 A | * | 4/1991 | Dempsey | G01T 1/185 250/374 |
| 5,298,755 A | * | 3/1994 | Wuest | G01N 21/45 250/374 |

(Continued)

FOREIGN PATENT DOCUMENTS

CN     104317214     1/2015

OTHER PUBLICATIONS

Tavernier, Detector Based on Ionisation in Gases, Jan. 1, 2009, Experimental Techniques in Nuclear and Particle Physics, pp. 105-142 (Year: 2009).*

(Continued)

*Primary Examiner* — David P Porta
*Assistant Examiner* — Gisselle M Gutierrez
(74) *Attorney, Agent, or Firm* — Fish & Richardson P.C.

(57) ABSTRACT

A muon detector includes: a chamber having a maximum cross-sectional dimension of 30 cm or less; a gas sealed inside the chamber ionized by the passage of atmospheric muons to form ions in the chamber; a cathode in the chamber at a first position; an anode in the chamber displaced from the first position, the anode including a mesh of wires; a micropattern gaseous detector arranged between the cathode and the anode and proximate to the anode and configured to receive the ions formed in the chamber between the anode and the cathode and generate electrons in response to each ion sufficient to generate a current in one or more of the mesh wires of the anode; and readout electronics in electrical communication with the anode to detect signals in response to the current generated in the mesh wires.

23 Claims, 10 Drawing Sheets

(56) References Cited

U.S. PATENT DOCUMENTS

| | | | | |
|---|---|---|---|---|
| 7,488,934 | B2* | 2/2009 | Bryman | G01V 5/08 |
| | | | | 250/266 |
| 7,531,791 | B2* | 5/2009 | Bryman | G01T 1/203 |
| | | | | 250/266 |
| 7,863,571 | B2* | 1/2011 | Beken | G01T 1/185 |
| | | | | 250/382 |
| 9,726,768 | B2* | 8/2017 | Friedman | H01L 31/115 |
| 10,585,208 | B1* | 3/2020 | Yaish | G01V 5/04 |
| 2006/0180753 | A1 | 8/2006 | Bryman | |
| 2007/0110208 | A1* | 5/2007 | Molina-Martinez | H02N 99/00 |
| | | | | 376/100 |
| 2008/0128604 | A1* | 6/2008 | Bryman | G01T 1/203 |
| | | | | 250/266 |
| 2009/0101824 | A1* | 4/2009 | Beken | H01J 47/02 |
| | | | | 250/358.1 |
| 2010/0265078 | A1* | 10/2010 | Friedman | H01L 31/115 |
| | | | | 340/600 |
| 2011/0035151 | A1 | 2/2011 | Botto | |
| 2013/0068956 | A1* | 3/2013 | Friedman | A61N 5/1075 |
| | | | | 250/382 |
| 2015/0001411 | A1* | 1/2015 | Friedman | G01T 1/2935 |
| | | | | 250/375 |
| 2016/0349381 | A1* | 12/2016 | Friedman | G01T 1/185 |
| 2017/0350991 | A1* | 12/2017 | Friedman | G01T 1/185 |
| 2019/0146117 | A1* | 5/2019 | Yaish | G01T 1/2935 |
| | | | | 250/288 |
| 2019/0212237 | A1* | 7/2019 | Lazaro Roche | G01V 5/04 |
| 2021/0156810 | A1* | 5/2021 | Botto | G01N 23/02 |
| 2022/0196874 | A1* | 6/2022 | Schouten | G01V 5/04 |
| 2022/0283068 | A1* | 9/2022 | Holma | G01V 5/04 |
| 2023/0029942 | A1* | 2/2023 | Kume | G01T 5/00 |
| 2023/0102216 | A1* | 3/2023 | Schouten | G01T 1/20 |
| | | | | 250/358.1 |
| 2023/0324571 | A1* | 10/2023 | Schouten | G01T 1/185 |
| | | | | 250/374 |

OTHER PUBLICATIONS

Bonechi et al., "Atmospheric Muons as an Imaging Tool," Reviews in Physics 5, 2020.
Cern, [online] "Detector," Nov. 16, 2021, retrieved on Apr. 19, 2023, retrieved from Internet Archive Wayback Machine URL<https://web.archive.org/web/20211116144839/https://cms.cern/book/exporl/html/1618>, URL<https://cms.cern/book/exporl/html/1618>, 30 pages.
International Search Report and Written Opinion in International Appln. No. PCT//US2023/013251, mailed on Aug. 10, 2023, 16 pages.
Patra et al., "Measurement of basic characteristics and gain uniformity of a triple GEM detector," May 10, 2017, retrieved on Apr. 19, 2023, retrieved from URL<https://arxiv.org/pdf/1705.03849.pdf>, 7 pages.

* cited by examiner

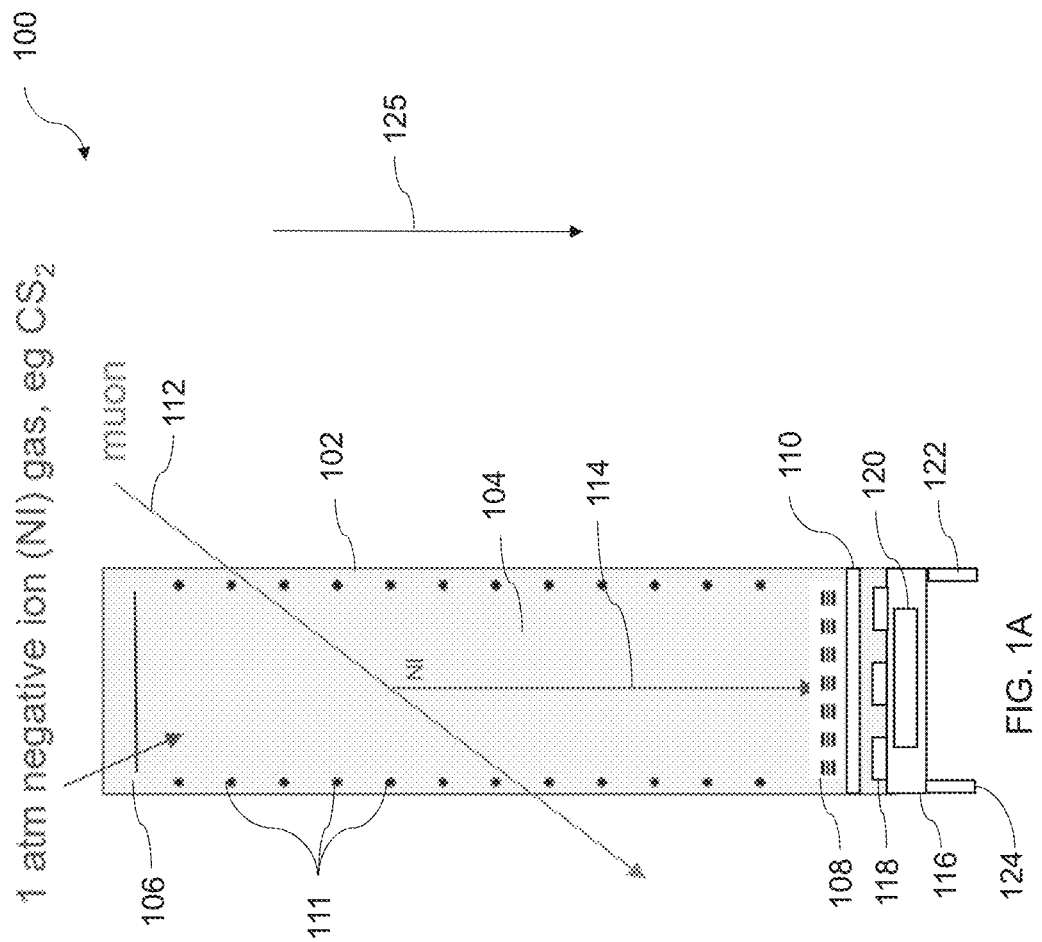

MUON DETECTOR FOR MUON TOMOGRAPHY

FIELD OF THE DISCLOSURE

The disclosure relates to muon tomography and more particularly, to muon detectors and systems for performing muon tomography for mineral exploration.

BACKGROUND

Muon tomography is a technique that uses cosmic ray muons to generate three-dimensional images of volumes based on the absorption or scattering of muons. Muons are much more deeply penetrating than X-rays, so muon tomography can be used to image through much thicker volumes of material than X-ray-based tomography, for example.

Cosmic rays generate muons in the Earth's upper atmosphere that travel in straight lines at close to the speed of light. The atmospheric muons that penetrate the Earth's surface lose energy and can scatter as they encounter material of different densities. Subsurface detectors can be used to survey an area and measure the atmospheric muon intensity. The addition of surface detectors can be used with subsurface detectors to measure muon scattering which is prevalent for high Z elements. Data from such detectors can be used to generate a three-dimensional map of subsurface density anomalies, including mineral deposits. Use of atmospheric muons as an imaging tool is described, for example, in a publication by L. Bonechi et al., *Reviews in Physics*, 5 (2020).

SUMMARY

Muon detectors with high resolution that are sufficiently compact and robust for deployment down a borehole are disclosed. Embodiments featuring gas electron multiplier (GEM) detectors can be used for this purpose. In particular, the GEM detectors can be used as part of a time projection chamber (TPC) device to provide high-resolution muon detection. The detectors can include readout electronics that are relatively low power, enabling long-term deployment using a power source, e.g., a battery, that does not significantly increase the size or cost of the detector. The detectors and systems utilizing the detectors can be sufficiently robust to reliably withstand harsh, remote environments for long periods.

In general, in a first aspect, the disclosure features a muon detector, including: a chamber extending along an axis, the chamber having a maximum cross-sectional dimension perpendicular to the axis of 30 cm or less; a gas sealed inside the chamber, the gas having a composition and pressure sufficient to be ionized by the passage of atmospheric muons through the chamber to form ions in the chamber; a cathode disposed in the chamber at a first axial position; an anode disposed in the chamber at a second axial position displaced from the first axial position, the anode comprising a mesh of wires; a micropattern gaseous detector arranged along the axis between the cathode and the anode and proximate to the anode and configured to receive the ions formed in the chamber between the anode and the cathode and generate electrons in response to each ion sufficient to generate a current in one or more of the mesh wires of the anode; and readout electronics in electrical communication with the anode and configured to detect signals in response to the current generated in the one or more of the mesh wires.

Implementations of the muon detector can include one or more of the following features. For example, the micropattern gaseous detector can include a gas electron multiplier (GEM). The GEM can include one or more foils each extending in a corresponding plane orthogonal to the axis, each foil including a multilayer structure having a dielectric layer with an electrically conducting layer on either side of the dielectric layer, the multilayer structure being perforated by an array of holes.

The muon detector can include one or more intermediate electrodes arranged in the chamber along the axis between the cathode and the anode to provide, when energized, an electric field to cause the negative ions or electrons to drift toward to the anode.

The gas can be an electro-negative gas.

The gas can be selected from the group composed of $CS_2$ and an $Ar/CO_2$ mixture. The $Ar/CO_2$ mixture can have a 70/30 ratio.

The gas can have a pressure in a range from 0.1 atm to 10 atm (e.g., about 1 atm or more, about 2 atm or more, about 5 atm or less).

The chamber can include an outer cylindrical wall extending along the axis, and the maximum cross-sectional dimension can correspond to the outer diameter of the cylinder.

The mesh of wires can include a first plurality of spaced-apart parallel wires extending in a first direction perpendicular to the axis and a second plurality of spaced-apart parallel wires extending in a second direction perpendicular to the axis, the first direction being orthogonal to the second direction.

The anode can be a first anode, the micropattern gaseous detector can be a first micropattern gaseous detector, and the muon detector can further include a second anode and a second micropattern gaseous detector arranged in the chamber, the cathode being arranged along the axis between the first and second anodes and the second micropattern gaseous detector being arranged along the axis between the cathode and the second anode.

The readout electronics can include a charge sensitive amplifier connected to the anode, an amplifier/shaper configured to generate a Gaussian pulse and amplify the signal generated in each wire, and a comparator to provide a digital signal based on an amplitude of the Gaussian pulse and a preselected threshold.

The muon detector can include an electrical power source configured to supply electrical power to the anode, cathode, micropattern gaseous detector, and readout electronics. The electrical power source can be a battery. The battery can be housed in the chamber The muon detector can include electrical circuitry configured to supply electrical power to the anode, cathode, micropattern gaseous detector, and readout electronics from an electrical power source external to the muon detector.

In general, in another aspect, the disclosure features a system, including: a plurality of muon detectors, each sized and shaped for deployment down a borehole, each muon detector including a chamber, a gas sealed inside the chamber, the gas having a composition and pressure sufficient to be ionized by the passage of atmospheric muons through the chamber to form ions in the chamber, and a micropattern gaseous detector arranged and configured to receive the ions formed in the chamber and generate electrons in response to each ion sufficient, each muon detector being configured to provide data corresponding to a direction of propagation of muons passing through the chamber; and an electronic processing apparatus in communication with each of the muon detectors and programmed to receive the data, to calculate the direction of muons passing through each of the muon detectors, and to determine information about subterranean mineral deposits based on the direction of the muons and the location of each of the muon detectors when deployed down one or more boreholes.

Implementations of the system can include one or more of the following features and/or features of other aspects. For example, the system can further include cabling attached to at least two of the plurality of muon detectors for suspending the at least two muon detectors at different depths down the same borehole.

In general, in yet a further aspect, the invention features a method that includes: deploying a muon detector at a location underground, the muon detector including a gas sealed inside a chamber and a plurality of electrodes, and a micropattern gaseous detector; energizing the plurality of electrodes to cause ions resulting from a passage of an atmospheric muon through the gas to interact with the micropattern gaseous detector to generate electrons; detecting the electrons at an anode of the plurality of electrodes; generating signals in response to detecting the electrons; receiving data from the muon detector based on the signals, the data including information about the passage of the atmospheric muon through the gas of the muon detector; and determining information about a subterranean mineral deposit based on a direction of the muon through the gas and the location of the muon detectors underground.

Implementations of the method can include one or more of the following features and/or features of other aspects. For example, the method can include deploying one or more additional muon detectors at different locations underground, receiving data from each of the one or more additional muon detectors, the data from each additional muon detector comprising information about the passage of one or more atmospheric muons through a respective one of the one or more additional muon detectors, and wherein the information about the subterranean mineral deposit is determined based on a direction of the passage of each of the one or more atmospheric muons through the respective muon detectors and a location of each of the respective muon detectors underground.

At least two of the muon detectors can be deployed underground down a common borehole. At least two of the muon detectors can be deployed underground down different boreholes.

The anode can include a wire mesh comprising a plurality of parallel wires and the signals are generated sequentially by adjacent ones of the parallel wires corresponding to a trajectory of the atmospheric muon through the gas.

Other advantages will be apparent from the description below, the figures, and the claims.

DESCRIPTION OF DRAWINGS

FIG. 1A is a cross-sectional schematic view of an example of a muon detector suitable for a muon tomography system.

In the drawings, like symbols indicate like elements.

DETAILED DESCRIPTION

Figure 1B:
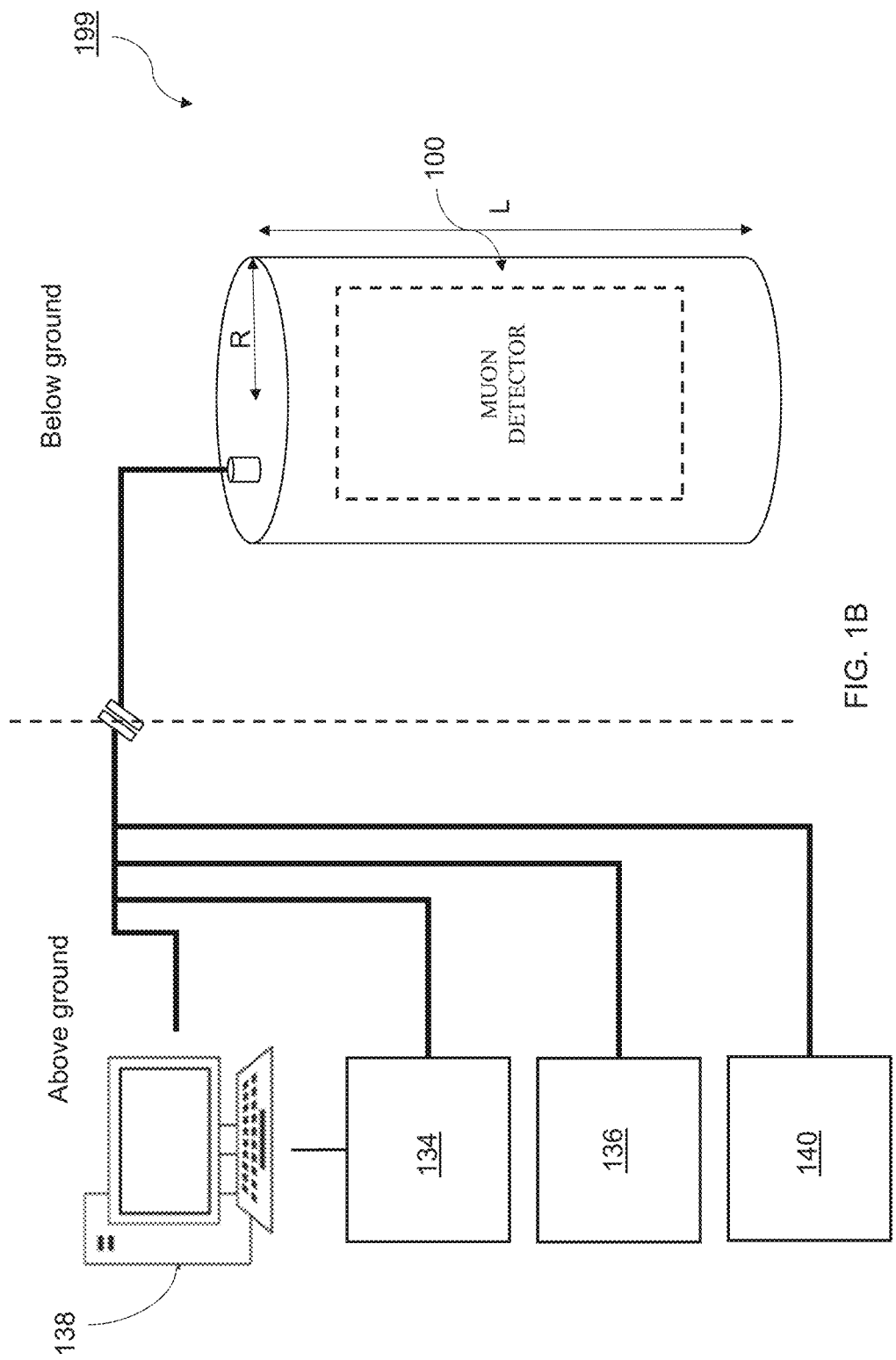
FIG. 1B is a plain view of the muon detector shown in FIG. 1A.

Referring to FIG. 1A, an example of a muon detector 100 suitable for a muon tomography system is shown schematically in cross-section. The muon detector 100 has a form factor suitable for deployment down a borehole. In particular, the muon detector 100 has a long dimension extending along an axis 125, and shorter dimensions orthogonal to axis 125. In some embodiments, the detector 100 is cylindrical or near-cylindrical in shape. The short dimension is sufficiently small to fit in a borehole and can be, at most, about 30 cm or less (e.g., 25 cm or less, 20 cm or less, 15 cm or less, 10 cm or less), while the long dimension can be about 50 cm or more (e.g., 75 cm or more, 100 cm or more, such as up to 200 cm). The aspect ratio of the long dimension to the short dimension can be about 2-to-1 or greater (e.g., about 3-to-1 or greater, about 4-to-1 or greater, about 5-to-1 or greater, about 8-to-1 or greater, such as about 10-to-1). Where borehole dimensions permit, larger detectors are possible. For example, in some embodiments, the short dimension can be more than 30 cm.

The muon detector 100 includes a cathode 106, a gas electron multiplier (GEM) 108, an anode 110, and readout electronics 118 mounted in order along axis 125 inside a closed chamber 102. The cathode 106 is located at one end of the chamber and the GEM 108, anode 110, and readout electronics 118 are located at the opposite end. Chamber 102 is a sealed enclosure containing a gas 104. Ports for a gas inlet 122 and another one for gas outlet 124 are provided. A series of ring electrodes 111 are positioned at a series of axial locations along the length of the chamber 102 between cathode 106 and GEM 108.

Generally, the gas 104 has a composition and pressure selected so that passage of a muon 112 through the chamber causes sufficient ionization for reliable detection. In some implementations, the gas 104 is a negative ion 114 gas, such as carbon disulfide ($CS_2$) gas. Gas mixtures can also be used, such as a mixture of Argon and $CO_2$ (e.g., at a ratio of about 70% Argon to about 30% $CO_2$). The gas 104 can have a pressure in a range of between 0.1 atmospheres (atm) to 10 atm, e.g., at about 1 atm. Pressure and gas purity of the gas can be maintained while the detector 100 is deployed downhole via gas lines connected to inlet 122 and outlet 124.

In general, the chamber 102 is formed from a material or materials that have sufficient mechanical strength to reliably maintain the integrity of the chamber during deployment, which can involve being in a high pressure, high heat environment for weeks or months at a time. The chamber 102 can be made from a metal or alloy (e.g., stainless steel, brass, aluminum), or other material having high mechanical strength.

The readout electronics 118 are supported on a printed circuit board (PCB) 116 which is placed inside the chamber 102 and are directly connected to the anode 110.

The cathode 106, GEM 108, anode 110, and the readout electronics 118 are powered by an internal power supply 120 (e.g., a battery) housed inside the chamber 102. Alternatively, or additionally, an external power supply, e.g. located on the surface, can be used to supply electrical power.

A feedthrough can be used to bring power and/or gas into the muon detector and provide event data and exhaust gas back to a surface station.

During operation, the cathode 106, anode 110, and electrodes 111 are energized to provide an electric field in the chamber, e.g., with field lines parallel to axis 125. Negative ions (e.g., 114) or electrons formed in gas 104 by the passage of muon 112 drift parallel to axis 125 until they reach GEM 110. Although a single ion path 114 is illustrated in FIG. 1A, in reality the muon 112 will generate ions along its entire path from when it enters chamber 102 until it exits. GEM 108 receives ions 114 formed in the chamber 102 between the anode110 and the cathode 106 and generates an avalanche of electrons in response to each ion. The electron avalanche from GEM 108 generates a current in the anode 110.

More specifically, the anode 108 includes a mesh of wires and the electrode avalanche generates a current at the wires in the mesh adjacent the location of the GEM where the avalanche occurs. The current produces a signal in the corresponding wire that is detectable by the readout electronics 118. Because a single muon will generate a string of negative ions or electrons as it passes through the chamber, and because the relative timing of the corresponding signal from each wire will depend on the propagation direction of the muon through the chamber, detector 100 can provide information about both the number of muons passing through the chamber and the direction of travel of each one.

Muon detector 100 is an example of a time projection chamber (TPC) which is a particle detector that uses an electric field together with a sensitive volume of gas or liquid to perform a three-dimensional reconstruction of a particle trajectory or interaction.

Alternative designs are possible. For example, in some embodiments, a muon detector can include two anodes and two GEMs, one of each located at opposing ends of the chamber with the cathode in between.

More generally, other gain structures can be used as an alternative to a GEM. For example, in some implementations, Micromegas detectors, or other types of micropattern gaseous detectors (MPGSs) can be used.

Referring to FIG. 1B, a muon tomography system 199 that includes the muon detector 100 also includes several components deployed on the surface to support operation of the muon detector 100 while the detector is below the surface. These components include a data processing and control system 138 (e.g., a computer) for processing data from the detector 100. The data processing system 138 uses software (e.g., custom software or software based on a commercially-available platform, such as LabVIEW) for data processing and analysis and for sending control signals to the detector 100. In the implementation depicted, system 138 and detector 100 are also connected to an external power supply 136 which provides electrical power to both. The external power supply 136 can include a battery and/or a power generator (e.g., solar, wind, or other type of generator). Tomography system 199 also includes a communication system 134 which allows for remote control of system 199. For example, communication system 134 can include a satellite link that enables communications to be sent to and from system 199 from anywhere in the world. A gas supply 140 is also located on the surface and facilitates delivery and exhausting of gas from the muon detector 100. The data processing and control system 138, power supply 136, gas supply 140, and communication system 134 are connected via cabling to the muon detector 100 downhole.

Figure 2:
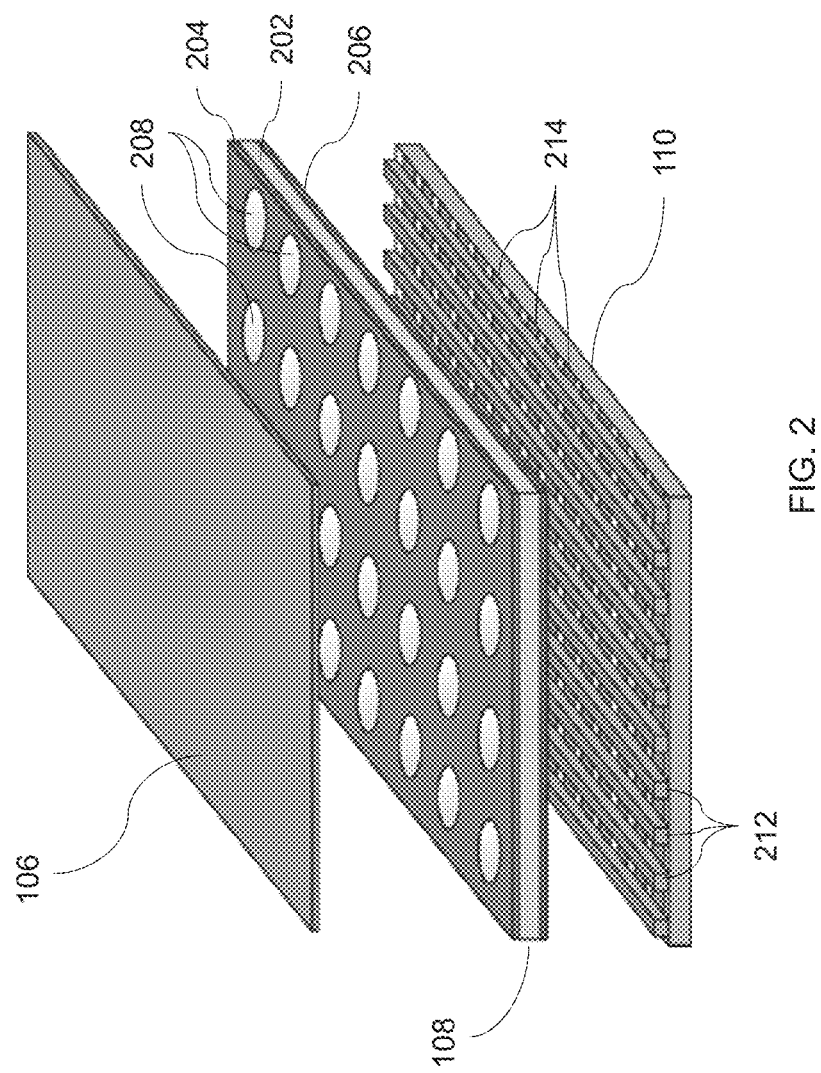
FIG. 2 is a perspective view of an example GEM detector.

Referring to FIG. 2, additional structure of an example of GEM 108 and anode110 are illustrated schematically along with cathode 106. The GEM 108 is composed of a three layer stack with two electrically conducting layers 204 and 206 on opposing surfaces of an electrically insulating layer 202. For example, layers 204 and 206 can be metal layers (e.g., copper) and layer 202 can be an appropriate plastic layer (e.g., Kapton). An array of holes 208 pierces the three layer stack. The holes 208 are typically a fraction of a millimeter across and similarly spaced apart.

For operation, typically a voltage of 150-400 V is placed across the electrically conducting layers 204 and 206, making large electric fields in the holes. Under these conditions, in the presence of appropriate gases, a single charged particle entering any hole will create an avalanche containing, e.g., 100-1000 electrons; this is the "gain" of the GEM.

Although GEM 108 is depicted as a single three layer in FIG. 2, more generally, multiple three layer stacks can be arranged next to each other to further enhance the electron cascade, increasing ion amplification by the GEM. Amplification of a million or more can be achieved using multiple stacks.

Anode 110 is composed of a wire mesh that includes a first planar layer of multiple parallel wires 212 supported by a second layer of parallel wires 214 running perpendicular to wires 212. The pitch of these wires can vary from 0.4 mm to 2 mm. An insulator (not shown) electrically isolates the two layers of wires from each other. More generally, since the readout strips (i.e., the wire mesh) are not involved in the amplification process, they can be made in any shape; 2-D strips and grids, hexagonal pads, radial/azimuthal segments, and other readout geometries are possible.

Figure 3:
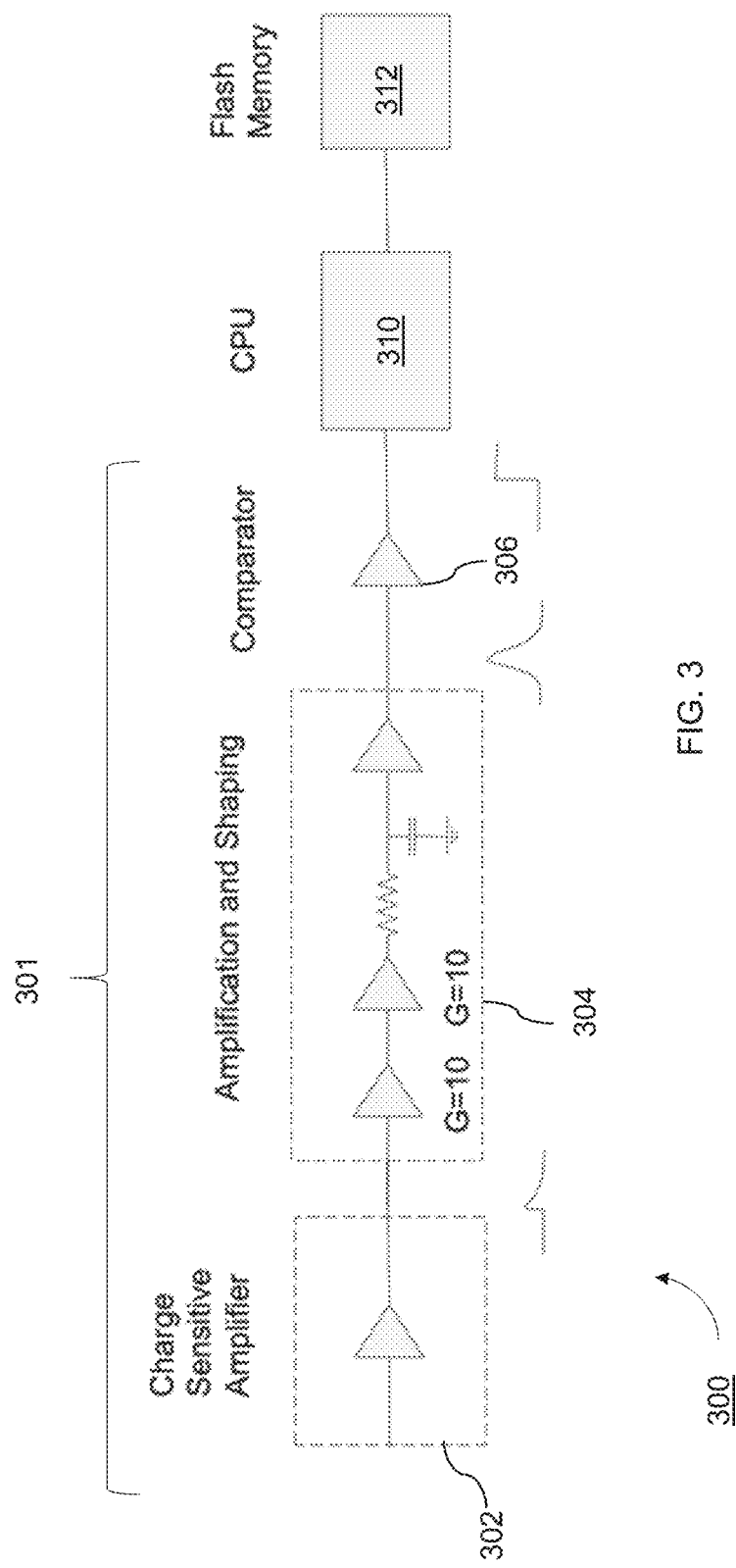
FIG. 3 is a schematic diagram of components of readout electronics for a muon detector.
Figure 4A:
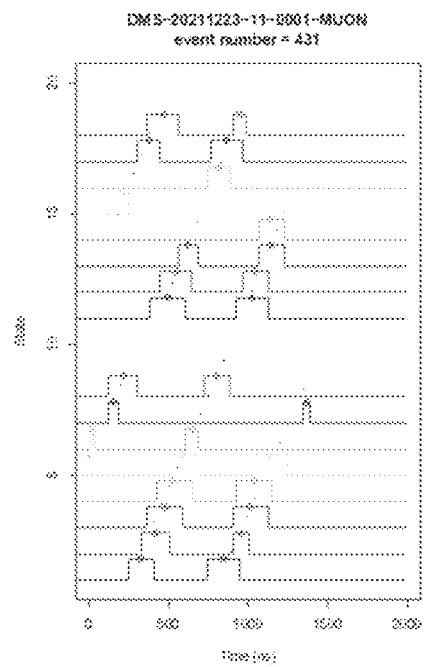
FIGS. 4A-4F are a plots showing signals generated by readout electronics in an example muon detector corresponding to the passage of an atmospheric muon passing through the detector.
Figure 4B:
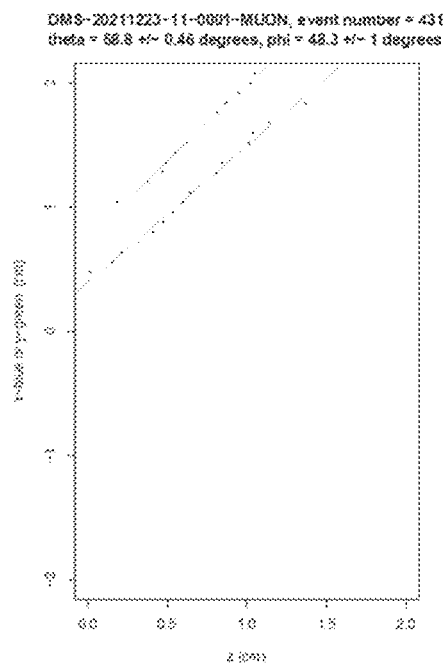
Figure 4C:
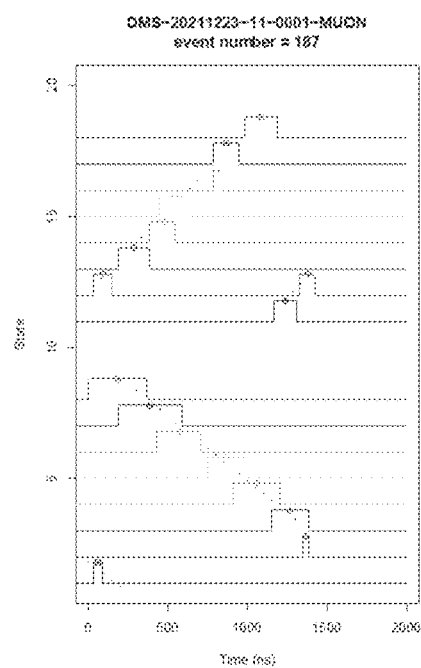
Figure 4D:
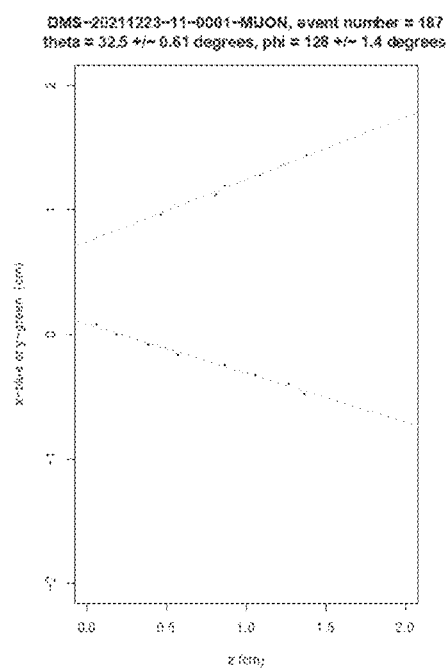
Figure 4E:
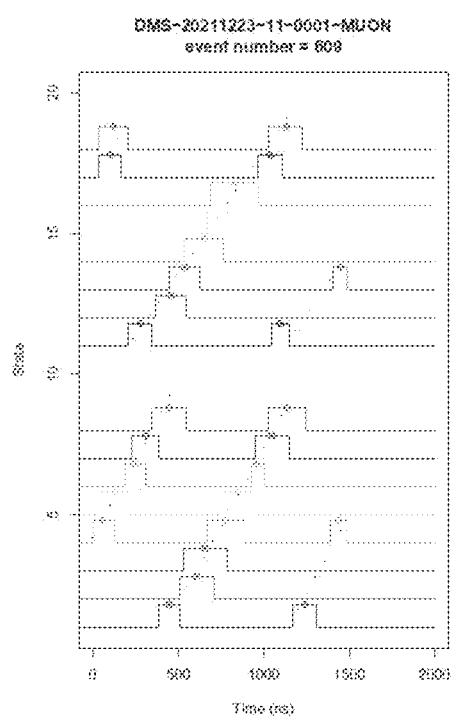
Figure 4F:
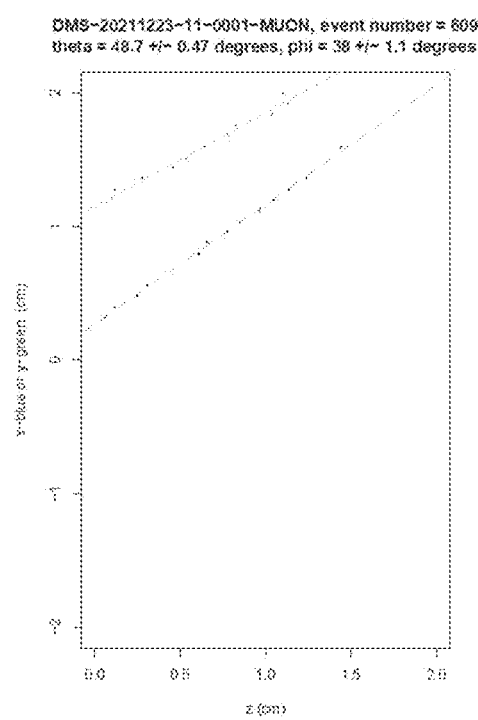

As noted above, readout electronics are used in the detection of signals generated in the wire mesh of anode 110. For downhole muon detection, the readout electronics should ideally be low power and compact. Referring to FIG. 3, in some embodiments, readout electronics include a readout circuit 301 for each wire (i.e., each channel) composing the grid of anode 110, that connect to a central processing unit 310 and memory unit 312

Readout circuit 301 includes a charge sensitive amplifier 302 which converts the collected charge to voltage with a gain (e.g., 10 mV/pC). Here, the output of amplifier 302 is depicted as single pulse with a short rise time and a long decay. This signal is received at an amplification and shaping module 304 composed of one or more amplifiers and CRC filters transforming the original pulse into a pseudo Gaussian. The output is a further amplified, more symmetric pulse which passes to a comparator 306. If the signal is above a preselected threshold, the comparator 306 outputs a digital signal indicative of a muon detection event at the corresponding anode wire.

As noted, each detection channel includes a readout circuit and CPU 310 receives the output of each. The CPU records the channel(s) going above threshold as well as the time at which it occurs. Memory 312 can be used to store data (channels and times) from CPU 310 compiled in response to each muon event for subsequent upload to the connected data processing and control system.

In some implementations, at least a portion of the readout circuit 301 (e.g., the entire readout circuit) is implemented in an integrated circuit. For example, readout circuit 301 can include a field programmable gate array (FPGA) and/or an application specific integrated circuit (ASIC).

In some cases, each readout line from the mesh electrode is connected to a corresponding readout circuit 301. Such an architecture can be implemented in a single, commercially-available FPGA. It is believed that such implementations can improve electronic noise associated with the detector, allowing each detection channel to be run at lower gain and/or with lower thresholding. This may improve longevity of the detector.

Alternatively, or additionally, a grouped readout can be used in which multiple readout lines from the mesh electrode are connected to a single readout circuit.

Generally, the resolution of the detector depends on the number of detection channels available, with a larger number of channels providing higher resolution. In some embodiments, 16 detection channels are used (e.g., 8 in each direction). Angular resolution of a muon trajectory can be 1 degree or better FIGS. 4A-4F are a plots showing example signals generated by readout electronics in an example muon detector 100 corresponding to the passage of an atmospheric muon through the detector. The plots show the time sequence of pulses from a 16 channel detector. In this example, there are 8 channels along the x-direction and 8 channels along the y-direction. The relative delay in the pulse sequence, clearly apparent in the lower 8 plots from one channel to the next correlates to the path of the muon through the chamber.

Figure 5:
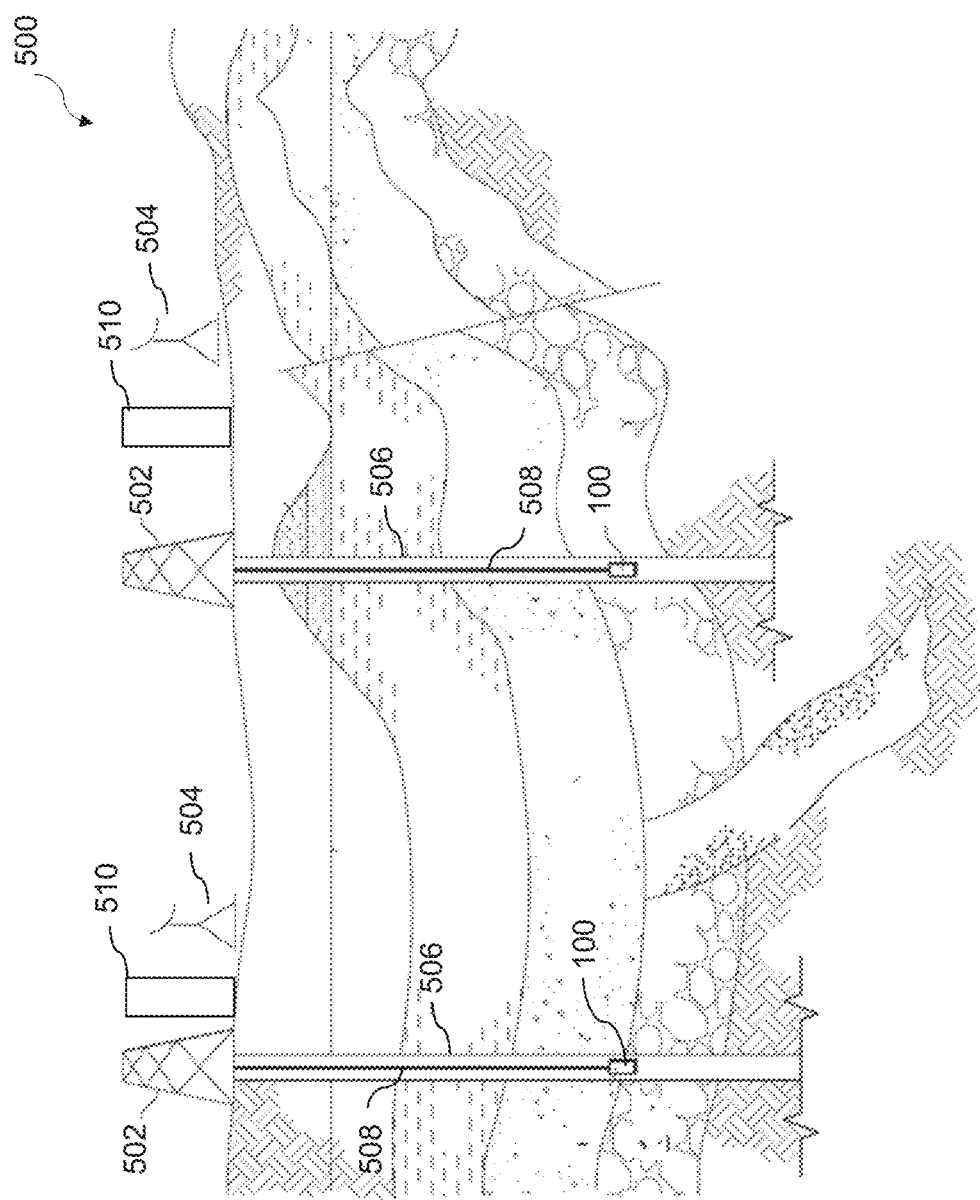
FIG. 5 is a schematic figure showing portions of an example muon tomography system with multiple muon detectors deployed underground.

FIG. 5 is a schematic showing portions of an example muon tomography system 500 with multiple muon detectors 100 deployed underground. At each borehole of interest 506 a station with a deck tower 502, network tower 504, and control station 510 (e.g., including a data processing and control system, a power supply, and/or a gas supply) is established. The detector 100 is run down the borehole on a string 508. In some implementations, each muon detector has its own electronic processing apparatus (e.g., at the surface and connected to network towers 504). Alternatively, all muon detectors can have a common electronic processing apparatus. The electronic processing apparatus can be in communication with each of the muon detectors and programmed to receive the data, to calculate the direction of muons passing through each of the muon detectors, and to determine information about subterranean mineral deposits based on the direction of the muons, and the location of each of the muon detectors when deployed down one or more boreholes.

In some implementations, the cabling suspends the muon detectors 100 at different depths down their respective boreholes.

Figure 6:
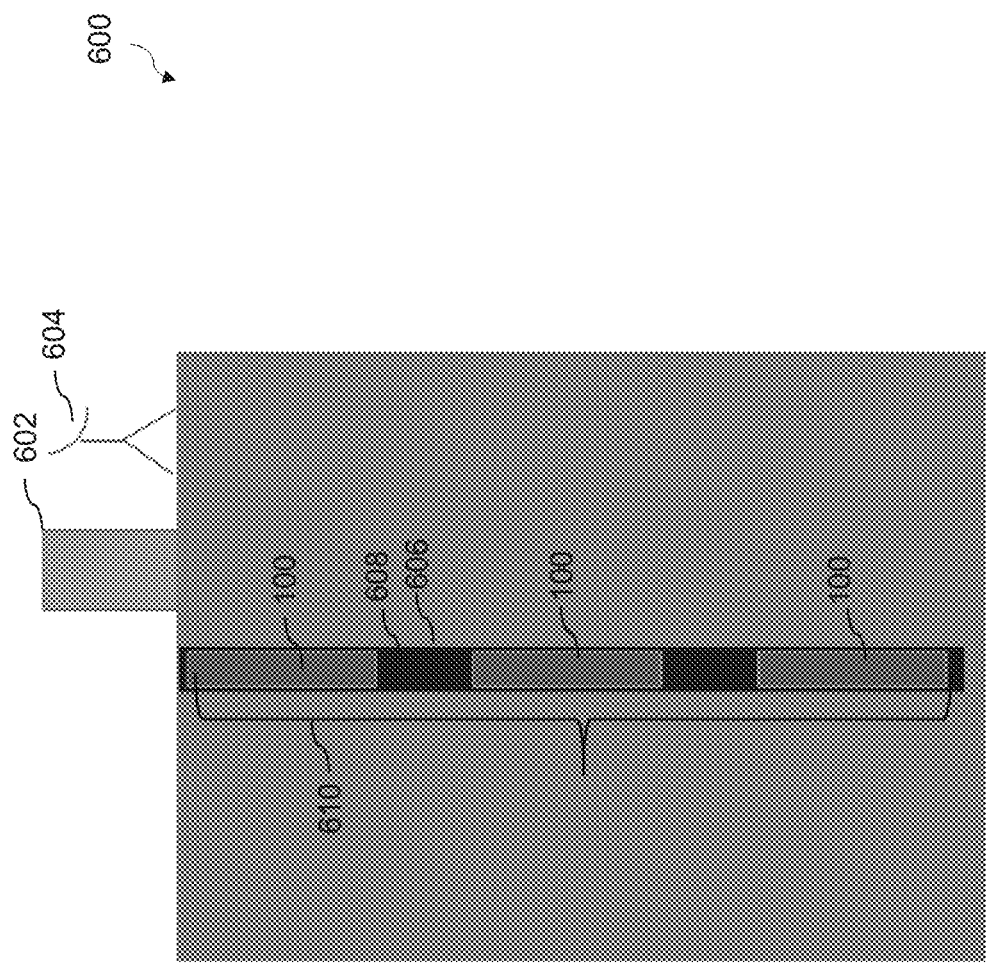
FIG. 6 is a schematic figure showing portions of an example muon tomography system with multiple muon detectors deployed down a single borehole.

While the system shown in FIG. 5 depicts a single muon detector deployed down each borehole, other arrangements are possible. For example, multiple muon detectors can be deployed down a single borehole and positioned at different depths underground. FIG. 6 is a schematic FIG. 600 showing portions of an example muon tomography system 610 with multiple muon detectors 100 deployed down a single borehole 606 on the same caballing 608. This type of configuration can be used for long-term, remote running having the control station 602 and network tower 604 installed at the borehole with the possibility for occasional visits. The control station 602 collects the local data transfers it via the network tower 604 to a remote location for further analysis.

Figure 7:
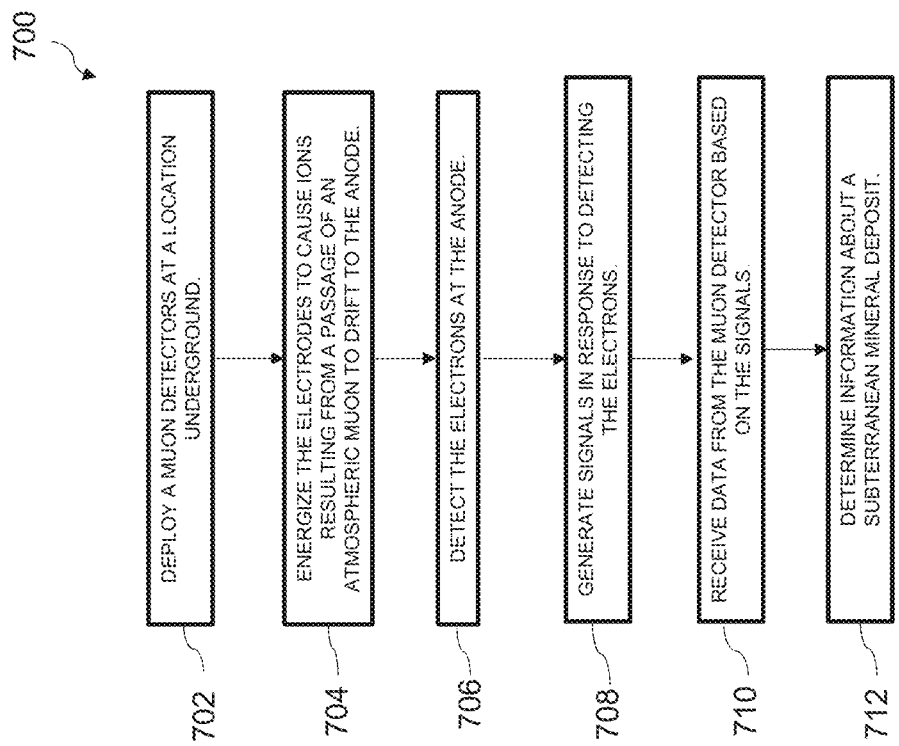
FIG. 7 is a flow chart showing method for operation of muon tomography system.

FIG. 7 is a flow chart 700 showing an example method for the operation of muon tomography system.

At step 702, a muon detector (e.g., muon detector 100) is deployed at a location underground. This step can be performed using conventional well-logging equipment and techniques.

At step 704, the muon detector is energized to cause ions resulting from a passage of an atmospheric muon through the gas in the detector to interact with the GEM to generate electrons. The GEM amplifies the electrons.

At step 706, the amplified electrons from the GEM are detected at the anode

At step 708, electron detection at each wire generates electrical signals (e.g., pulses) in the wires. Where the anode is composed of a wire mesh with multiple parallel wires, the signals are generated sequentially by adjacent wires corresponding to a trajectory of the atmospheric muon through the gas. The signals are amplified, shaped, and the time at which they cross threshold is recorded to provide data for downstream analysis. In some embodiment of the detector, the signal may be digitized.

At step 710, the data from the muon detector based on the generated signals are received by a data analysis system (e.g., a surface based computer). The data includes information about the passage of an atmospheric muon through the gas of the muon detector and the time at which the muon was detected. This information can include altitude and azimuth information as well as, potentially, ionization information, from which the speed of the muon may be determined.

At step 712, the data analysis system determines information about subterranean anomalies (e.g., mineral deposits) based on the muon data. Typically, this determination is made over the course of many muon detection events, e.g., by a statistically sampling sufficiently large to identify variations in the frequency at which muons from different directions are detected.

In some implementations, one or more additional muon detectors are deployed at different locations underground, and data from each of the one or more additional muon detectors is received an analyzed. Subsequently, information about a subterranean mineral deposit can be determined based on data from multiple detectors. In general, confidence in identifying anomalies increases over time as more data is collected and more robust understating of where to drill next is gained. The advantages of the GEM detectors are excellent position resolution, good timing, high rate detection capabilities, low ion backflow, design flexibility, and large area coverage.

Figure 8:
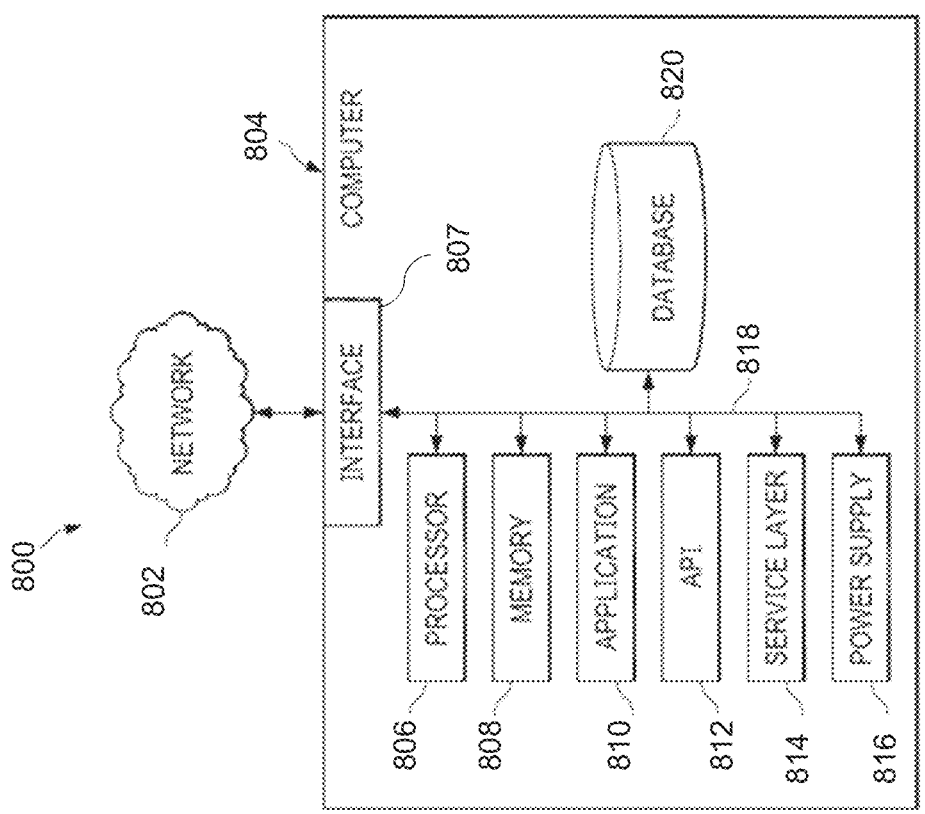
FIG. 8 is a schematic diagram of an example electronic processing apparatus suitable for use in a muon tomography system.

FIG. 8 is a block diagram 800 of an example computer system 804 used to provide computational functionalities associated with described algorithms, methods, functions, processes, flows, and procedures described in the present disclosure, according to some implementations of the present disclosure. The illustrated computer 804 is intended to encompass any computing device such as a server, a desktop computer, a laptop/notebook computer, a wireless data port, a smartphone, a personal data assistant (PDA), a tablet computing device, or one or more processors within these devices, including physical instances, virtual instances, or both. The computer 804 can include input devices such as keypads, keyboards, and touch screens that can accept user information. Also, the computer 804 can include output devices that can convey information associated with the operation of the computer 804 The information can include digital data, visual data, audio information, or a combination of information. The information can be presented in a graphical user interface (UI) (or GUI).

The computer 804 can serve in a role as a client, a network component, a server, a database, a persistency, or components of a computer system for performing the subject matter described in the present disclosure. The illustrated computer 804 is communicably coupled with a network 802. In some implementations, one or more components of the computer 804 can be configured to operate within different environments, including cloud-computing-based environments, local environments, global environments, and combinations of environments.

At a high level, the computer 804 is an electronic computing device operable to receive, transmit, process, store, and manage data and information associated with the described subject matter. According to some implementations, the computer 804 can also include, or be communicably coupled with, an application server, an email server, a web server, a caching server, a streaming data server, or a combination of servers.

The computer 804 can receive requests over network 802 from a client application (for example, executing on another computer 804). The computer 804 can respond to the received requests by processing the received requests using software applications. Requests can also be sent to the computer 804 from internal users (for example, from a command console), external (or third) parties, automated applications, entities, individuals, systems, and computers. Each of the components of the computer 804 can communicate using a system bus 818. In some implementations, any or all of the components of the computer 804, including hardware or software components, can interface with each other or the interface 807 (or a combination of both), over the system bus 818. Interfaces can use an application programming interface (API) 812, a service layer 814, or a combination of the API 812 and service layer 814. The API 812 can include specifications for routines, data structures, and object classes. The API 812 can be either computer-language independent or dependent. The API 812 can refer to a complete interface, a single function, or a set of APIs.

The service layer 814 can provide software services to the computer 804 and other components (whether illustrated or not) that are communicably coupled to the computer 804. The functionality of the computer 804 can be accessible for all service consumers using this service layer. Software services, such as those provided by service layer 814, can provide reusable, defined functionalities through a defined interface. For example, the interface can be software written in JAVA, C++, or a language providing data in extensible markup language (XML) format. While illustrated as an integrated component of the computer 804, in alternative implementations, the API 812 or the service layer 814 can be stand-alone components in relation to other components of the computer 804 and other components communicably coupled to the computer 804. Moreover, any or all parts of the API 812 or the service layer 814 can be implemented as child or sub-modules of another software module, enterprise application, or hardware module without departing from the scope of the present disclosure The computer 804 includes an interface 807. Although illustrated as a single interface 807 in FIG. 8, two or more interfaces 807 can be used according to particular needs, desires, or particular implementations of the computer 804 and the described functionality. The interface 807 can be used by the computer 804 for communicating with other systems that are connected to the network 802 (whether illustrated or not) in a distributed environment. Generally, the interface 807 can include, or be implemented using, logic encoded in software or hardware (or a combination of software and hardware) operable to communicate with the network 802. More specifically, the interface 807 can include software supporting one or more communication protocols associated with communications. As such, the network 802 or the interface's hardware can be operable to communicate physical signals within and outside of the illustrated computer 804.

The computer 804 includes a processor 806. Although illustrated as a single processor 806 in FIG. 8, two or more processors 806 can be used according to particular needs, desires, or particular implementations of the computer 804 and the described functionality. Generally, the processor 806 can execute instructions and can manipulate data to perform the operations of the computer 804, including operations using algorithms, methods, functions, processes, flows, and procedures as described in the present disclosure.

The computer 804 also includes a database 820 that can hold data for the computer 804 and other components connected to the network 802 (whether illustrated or not). For example, database 820 can be an in-memory, conventional, or a database storing data consistent with the present disclosure. In some implementations, database 820 can be a combination of two or more different database types (for example, hybrid in-memory and conventional databases) according to particular needs, desires, or particular implementations of the computer 804 and the described functionality. Although illustrated as a single database 820 in FIG. 8, two or more databases (of the same, different, or combination of types) can be used according to particular needs, desires, or particular implementations of the computer 804 and the described functionality. While database 820 is illustrated as an internal component of the computer 804, in alternative implementations, database 820 can be external to the computer 804.

The computer 804 also includes a memory 808 that can hold data for the computer 804 or a combination of components connected to the network 802 (whether illustrated or not). Memory 808 can store any data consistent with the present disclosure. In some implementations, memory 808 can be a combination of two or more different types of memory (for example, a combination of semiconductor and magnetic storage) according to particular needs, desires, or particular implementations of the computer 804 and the described functionality. Although illustrated as a single memory 808 in FIG. 8, two or more memories 808 (of the same, different, or combination of types) can be used according to particular needs, desires, or particular implementations of the computer 804 and the described functionality. While memory 808 is illustrated as an internal component of the computer 804, in alternative implementations, memory 808 can be external to the computer 804.

The application 810 can be an algorithmic software engine providing functionality according to particular needs, desires, or particular implementations of the computer 804 and the described functionality. For example, application 810 can serve as one or more components, modules, or applications. Further, although illustrated as a single application 810, the application 810 can be implemented as multiple applications 810 on the computer 804. In addition, although illustrated as internal to the computer 804, in alternative implementations, the application 810 can be external to the computer 804.

The computer 804 can also include a power supply 816. The power supply 816 can include a rechargeable or non-rechargeable battery that can be configured to be either user- or non-user-replaceable. In some implementations, the power supply 816 can include power-conversion and management circuits, including recharging, standby, and power management functionalities. In some implementations, the power-supply 816 can include a power plug to allow the computer 804 to be plugged into a wall socket or a power source to, for example, power the computer 804 or recharge a rechargeable battery.

There can be any number of computers 804 associated with, or external to, a computer system containing computer 804, with each computer 804 communicating over network 802. Further, the terms "client," "user," and other appropriate terminology can be used interchangeably, as appropriate, without departing from the scope of the present disclosure. Moreover, the present disclosure contemplates that many users can use one computer 804 and one user can use multiple computers 804.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially-generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A muon detector, comprising:
  a chamber extending along an axis, the chamber having a maximum cross-sectional dimension perpendicular to the axis of 30 cm or less;
  a gas sealed inside the chamber, the gas having a composition and pressure sufficient to be ionized by the passage of atmospheric muons through the chamber to form ions or electrons in the chamber;
  a cathode disposed in the chamber at a first axial position;
  an anode disposed in the chamber at a second axial position displaced from the first axial position, the anode comprising a mesh of wires;
  a micropattern gaseous detector arranged along the axis between the cathode and the anode and proximate to the anode and configured to receive the ions or electrons formed in the chamber between the anode and the cathode and generate electrons in response to each ion or electron sufficient to generate a current in one or more of the mesh wires of the anode; and
  readout electronics in electrical communication with the anode and configured to detect signals in response to the current generated in the one or more of the mesh wires,
  wherein the readout electronics comprises a charge sensitive amplifier connected to the anode, an amplifier/shaper configured to generate a Gaussian pulse and amplify the signal generated in each wire, and a comparator to provide a digital signal based on an amplitude of the Gaussian pulse and a preselected threshold.

2. The muon detector of claim 1, wherein the micropattern gaseous detector comprises a gas electron multiplier (GEM).

3. The muon detector of claim 2, wherein the GEM comprises one or more foils each extending in a corresponding plane orthogonal to the axis, each foil comprises a multilayer structure comprising a dielectric layer with an electrically conducting layer on either side of the dielectric layer, the multilayer structure being perforated by an array of holes.

4. The muon detector of claim 1, further comprising one or more intermediate electrodes arranged in the chamber along the axis between the cathode and the anode to provide, when energized, an electric field to cause the ions or electrons to drift toward to the anode.

5. The muon detector of claim 1, wherein the gas has a pressure in a range from 0.1 atm to 10 atm.

6. The muon detector of claim 1, wherein the chamber comprises an outer cylindrical wall extending along the axis, and the maximum cross-sectional dimension corresponds to the outer diameter of the cylinder.

7. The muon detector of claim 1, wherein the mesh of wires comprises a first plurality of spaced-apart parallel wires extending in a first direction perpendicular to the axis and a second plurality of spaced-apart parallel wires extending in a second direction perpendicular to the axis, the first direction being orthogonal to the second direction.

8. The muon detector of claim 1, wherein the anode is a first anode, the micropattern gaseous detector is a first micropattern gaseous detector, and the muon detector further comprises a second anode and a second micropattern gaseous detector arranged in the chamber, the cathode being arranged along the axis between the first and second anodes and the second micropattern gaseous detector being arranged along the axis between the cathode and the second anode.

9. The muon detector of claim 1, further comprising an electrical power source configured to supply electrical power to the anode, cathode, micropattern gaseous detector, and readout electronics.

10. The muon detector of claim 9, wherein the electrical power source is a battery.

11. The muon detector of claim 10, wherein the battery is housed in the chamber.

12. The muon detector of claim 1, comprising electrical circuitry configured to supply electrical power to the anode, cathode, micropattern gaseous detector, and readout electronics from an electrical power source external to the muon detector.

13. The muon detector of claim 1, wherein the gas is an electro-negative gas.

14. The muon detector of claim 1, wherein the gas is selected from the group consisting of $CS_2$ and an $Ar/CO_2$ mixture.

15. The muon detector of claim 14, wherein the $Ar/CO_2$ mixture has a 70/30 ratio.

16. A system, comprising:
  a plurality of muon detectors, each sized and shaped for deployment down a borehole, each muon detector comprising a chamber, a gas sealed inside the chamber, the gas having a composition and pressure sufficient to be ionized by the passage of atmospheric muons through the chamber to form ions in the chamber, a micropattern gaseous detector arranged and configured to receive the ions or electrons formed in the chamber and generate electrons in response to each ion, an anode comprising a mesh of wires arranged to generate a current in one or more of the mesh wires in response to the generated electrons, and readout electronics in electrical communication with the anode and configured to detect signals in response to the current generated in the one or more of the mesh wires, the readout electronics comprising a charge sensitive amplifier connected to the anode, an amplifier/shaper configured to generate a Gaussian pulse and amplify the signal generated in each wire, and a comparator to provide a digital signal based on an amplitude of the Gaussian pulse and a preselected threshold,
  each muon detector being configured to provide data corresponding to a direction of propagation of muons passing through the chamber; and
  an electronic processing apparatus in communication with each of the muon detectors and programmed to receive the data, to calculate the direction of muons passing through each of the muon detectors, and to determine information about subterranean mineral deposits based on the direction of the muons and the location of each of the muon detectors when deployed down one or more boreholes.

17. The system of claim 16, further comprising cabling attached to at least two of the plurality of muon detectors for suspending the at least two muon detectors at different depths down the same borehole.

18. A method, comprising:
  deploying a muon detector at a location underground, the muon detector comprising a gas sealed inside a chamber and a plurality of electrodes, a micropattern gaseous detector, and readout electronics;

energizing the plurality of electrodes to cause ions or electrons resulting from a passage of an atmospheric muon through the gas to interact with the micropattern gaseous detector to generate electrons;

detecting the generated electrons at an anode of the plurality of electrodes;

generating signals at the anode in response to detecting the generated electrons;

generating, using the readout electronics, digital signals from the signals generated at the anode, the readout electronics comprising a charge sensitive amplifier connected to the anode, an amplifier/shaper configured to generate a Gaussian pulse and amplify each signal generated by the anode, and a comparator to provide the digital signals based on an amplitude of the Gaussian pulse and a preselected threshold;

receiving data from the muon detector based on the digital signals, the data comprising information about the passage of the atmospheric muon through the gas of the muon detector; and determining information about a subterranean mineral deposit based on a direction of the muon through the gas and the location of the muon detectors underground.

19. The method of claim 18, further comprising deploying one or more additional muon detectors at different locations underground, receiving data from each of the one or more additional muon detectors, the data from each additional muon detector comprising information about the passage of one or more atmospheric muons through a respective one of the one or more additional muon detectors, and wherein the information about the subterranean mineral deposit is determined based on a direction of the passage of each of the one or more atmospheric muons through the respective muon detectors and a location of each of the respective muon detectors underground.

20. The method of claim 19, wherein at least two of the muon detectors are deployed underground down a common borehole.

21. The method of claim 19, wherein at least two of the muon detectors are deployed underground down different boreholes.

22. The method of claim 18, wherein the anode comprises a wire mesh comprising a plurality of parallel wires and the signals are generated sequentially by adjacent ones of the parallel wires corresponding to a trajectory of the atmospheric muon through the gas.

23. The muon detector of claim 1, wherein the gas has a composition and pressure sufficient to be ionized by the passage of atmospheric muons through the chamber to form negative ions in the chamber.

* * * * *